United States Patent
Lombardi et al.

(10) Patent No.: US 11,087,521 B1
(45) Date of Patent: *Aug. 10, 2021

(54) SYSTEMS AND METHODS FOR RENDERING AVATARS WITH DEEP APPEARANCE MODELS

(71) Applicant: Facebook Technologies, LLC, Menlo Park, CA (US)

(72) Inventors: Stephen Anthony Lombardi, Pittsburgh, PA (US); Jason Saragih, Pittsburgh, PA (US); Yaser Sheikh, Pittsburgh, PA (US); Takaaki Shiratori, Pittsburgh, PA (US); Shoou-I Yu, Pittsburgh, PA (US); Tomas Simon Kreuz, Pittsburgh, PA (US); Chenglei Wu, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,953

(22) Filed: Jan. 29, 2020

Related U.S. Application Data

(63) Continuation of application No. 16/049,848, filed on Jul. 31, 2018, now Pat. No. 10,586,370.

(Continued)

(51) Int. Cl.
*G06T 13/40* (2011.01)
*G06T 17/20* (2006.01)
(Continued)

(52) U.S. Cl.
CPC .............. *G06T 13/40* (2013.01); *G06T 15/04* (2013.01); *G06T 15/205* (2013.01); *G06T 17/20* (2013.01); *G06T 15/06* (2013.01); *G06T 19/006* (2013.01)

(58) Field of Classification Search
CPC ....... G06T 13/40; G06T 15/04; G06T 15/205; G06T 17/20
See application file for complete search history.

(56) References Cited

U.S. PATENT DOCUMENTS

| 2014/0092439 A1 | 4/2014 | Krig |
| 2017/0076474 A1 | 3/2017 | Fu et al. |

(Continued)

FOREIGN PATENT DOCUMENTS

| CN | 111542861 A | 8/2020 |
| WO | 2019/135935 A1 | 7/2019 |

OTHER PUBLICATIONS

Lopez-Martin, Manuel, et al. "Conditional variational autoencoder for prediction and feature recovery applied to intrusion detection in iot." Sensors 17.9 (2017): 1967 (p. 1-17).*

(Continued)

*Primary Examiner* — Sarah Lhymn
(74) *Attorney, Agent, or Firm* — FisherBroyles, LLP

(57) ABSTRACT

The disclosed computer system may include an input module, an autoencoder, and a rendering module. The input module may receive geometry information and images of a subject. The geometry information may be indicative of variation in geometry of the subject over time. Each image may be associated with a respective viewpoint and may include a view-dependent texture map of the subject. The autoencoder may jointly encode texture information and the geometry information to provide a latent vector. The autoencoder may infer, using the latent vector, an inferred geometry and an inferred view-dependent texture of the subject for a predicted viewpoint. The rendering module may be configured to render a reconstructed image of the subject for the predicted viewpoint using the inferred geom- (Continued)

etry and the inferred view-dependent texture. Various other systems and methods are also disclosed.

20 Claims, 11 Drawing Sheets

Related U.S. Application Data

(60) Provisional application No. 62/614,776, filed on Jan. 8, 2018.

(51) Int. Cl.
    *G06T 15/04*     (2011.01)
    *G06T 15/20*     (2011.01)
    *G06T 15/06*     (2011.01)
    *G06T 19/00*     (2011.01)

(56) References Cited

U.S. PATENT DOCUMENTS

| | | |
|---|---|---|
| 2017/0091535 A1 | 3/2017 | Yu et al. |
| 2018/0247201 A1 | 8/2018 | Liu et al. |
| 2018/0268262 A1 | 9/2018 | Osada et al. |
| 2018/0314917 A1 | 11/2018 | Mehr et al. |
| 2018/0336464 A1 | 11/2018 | Karras et al. |
| 2018/0365874 A1 | 12/2018 | Hadap et al. |
| 2019/0045317 A1 | 2/2019 | Badhwar et al. |
| 2019/0057509 A1 | 2/2019 | Lv et al. |
| 2019/0095698 A1 | 3/2019 | Mole et al. |
| 2019/0147642 A1 | 5/2019 | Cole et al. |
| 2019/0213772 A1 | 7/2019 | Lombardi et al. |

OTHER PUBLICATIONS

Hou, X., Shen, L., Sun, K., & Qiu, G. (Mar. 2017). Deep feature consistent variational autoencoder. In 2017 IEEE Winter Conference on Applications of Computer Vision (WACV) (pp. 1133-1141). IEEE.*

Chen, Xi, Diederik P. Kingma, Tim Salimans, Yan Duan, Prafulla Dhariwal, John Schulman, Ilya Sutskever, and Pieter Abbeel. "Variational lossy autoencoder." arXiv preprint arXiv: 1611.02731 (2016).*

Li, Jinxing, Bob Zhang, and David Zhang. "Shared autoencoder Gaussian process latent variable model for visual classification." IEEE transactions on neural networks and learning systems 29.9 (2017): 4272-4286.*

International Search Report and Written Opinion received for PCT Application Serial No. PCT/US2018/066924 dated Apr. 18, 2019, 16 pages.

Cao et al., "Real-time Facial Animation with Image-based Dynamic Avatars", ACM Transactions on Graphics, vol. 35, No. 4, Article 126, Jul. 31, 2016, pp. 126:1-126:12.

Tewari et al., "MoFA: Model-based Deep Convolutional Face Autoencoder for Unsupervised Monocular Reconstruction", IEEE International Conference on Computer Vision Workshops (ICCVW), Oct. 29, 2017, pp. 1274-1283.

Lugrin et al., "FaceBo: Real-Time Face and Body Tracking for Faithful Avatar Synthesis", IEEE Virtual Reality Conference, Mar. 23, 2016, pp. 225-226.

Bousmalis et al., "Unsupervised Pixel-Level Domain Adaptation with Generative Adversarial Networks", IEEE Conference on Computer Vision and Pattern Recognition, Jul. 26, 2017, pp. 95-104.

Notice of Allowance received for U.S. Appl. No. 16/049,848 dated Oct. 28, 2019, 72 pages.

Hou et al., "Deep Feature Consistent Variational Autoencoder", IEEE Winter Conference on Applications of Computer Vision (WACV), Mar. 2017, pp. 1133-1141.

Gulrajani et al., "PixelVae: A Latent Variable Model for Natural Images", Nov. 15, 2016, pp. 1-9.

Nash et al., "The shape variational autoencoder: A deep generative model of part-segmented 3D objects", Computer Graphics Forum, vol. 36, No. 5, Aug. 2017, pp. 1-12.

Lassner et al., "A Generative Model of People in Clothing", Proceedings of the IEEE International Conference on Computer Vision, 2017, pp. 853-862.

Chandra et al., "Texture Synthesis with Recurrent Variational Auto-Encoder", Dec. 23, 2017, pp. 1-7.

International Preliminary Report on Patentability received for PCT Application Serial No. PCT/US2018/066924 dated Jul. 23, 2020, 11 pages.

Extended European Search Report received for EP Patent Application Serial No. 18898850.5 dated Feb. 10, 2021, 8 pages.

Lombardi et al., "Deep Appearance Models for Face Rendering", ACM Transactions on Graphics, vol. 37, No. 4, Article 68, Aug. 2018, pp. 1-13.

Ranjan et al., "Generating 3D Faces Using Convolutional Mesh Autoencoders", European Conference on Computer Vision, Part of the Lecture Notes in Computer Science, vol. 11207, Springer, Aug. 31, 2018, 21 pages.

Kristiadi, Augustinus, "Conditional Variational Autoencoder: Intuition and Implementation", URL: URL:https://wiseodd.github.io/techblog/2016/12/17/conditional-vae/, Augustinus Kristiadi's Blog, Dec. 17, 2016, 5 pages.

\* cited by examiner

US 11,087,521 B1

SYSTEMS AND METHODS FOR RENDERING AVATARS WITH DEEP APPEARANCE MODELS

CROSS REFERENCE TO RELATED APPLICATIONS

This application is a continuation of U.S. patent application Ser. No. 16/049,848, filed Jul. 31, 2018, the disclosure of which is incorporated, in its entirety, by this reference. This application also claims the benefit of U.S. Provisional Application No. 62/614,776, filed 8 Jan. 2018, the disclosure of which is incorporated, in its entirety, by this reference.

BACKGROUND

With the advent of modern virtual reality (VR) and augmented reality (AR) headsets, there is a need for improved computer graphics models to enhance immersion. Human faces may be particularly challenging, but critical, for immersive social experiences. For example, in order to provide a virtual experience with the richness and depth of a face-to-face interaction, the nuances of the social signals between participants should be captured and displayed with accuracy. However, achieving real-time rendering of human faces has shown to be an arduous task. For example, the human face may contain fine geometric structures, such as eyelashes, pores, and vellus hair, that may be difficult to model. These and other factors may make it difficult to provide photorealistic rendering of dynamic and socially interactive scenes.

SUMMARY

As will be described in greater detail below, the instant disclosure describes utilizing deep appearance models to render human faces and other subjects as avatars for VR/AR presentations.

In one example, a computer system may include an input module, an autoencoder, and a rendering module. The input module may be configured to receive geometry information and a plurality of images. The geometry information may be indicative of a variation in geometry of a subject over a time period, and the time period may include a plurality of time instants. The plurality of images that are received may be a plurality of images of the subject at each time instant of the plurality of time instants, and each image may be associated with a respective viewpoint of the subject. Each image may include a view-dependent texture map of the subject that is dependent on the respective viewpoint of the subject. The autoencoder may be configured to jointly encode texture information and the geometry information to provide a latent vector. The autoencoder may further be configured to infer, using the latent vector, an inferred geometry of the subject for a predicted viewpoint, and an inferred view-dependent texture of the subject for the predicted viewpoint. The rendering module may be configured to render a reconstructed image of the subject for the predicted viewpoint using the inferred geometry and the inferred view-dependent texture.

In some embodiments, for each time instant of the plurality of time instants, the autoencoder may be configured to average the respective view-dependent texture maps associated with the plurality of images. The autoencoder may be a conditional autoencoder, and the autoencoder may be configured to condition at least one variable that is associated with each image. In some embodiments, the latent vector may not contain any information about the at least one variable. In addition, the at least one variable may include the respective viewpoint associated with each image, and the latent vector may not contain any viewpoint information.

In some embodiments, the latent vector may include a representation of a facial expression of the subject. In some embodiments, the geometry information may include a three-dimensional mesh of the subject that is tracked over the time period. In some embodiments, the image may have a plurality of pixels, each pixel may have an associated color, and the computer system may be configured to unwrap the view-specific texture map by casting rays through each pixel and assigning an intersected texture coordinate to the color of each respective pixel. In some embodiments, the computer system may be configured to infer the inferred geometry and the inferred view-dependent texture in real-time and render an animated series of reconstructed images of the subject in real-time. The rendered animated series of reconstructed images may include virtual reality (VR) or an augmented reality (AR) presentation for display on a VR or AR (VR/AR) headset.

In another example, a computer-implemented method may include receiving, jointly encoding, inferring, and rendering steps. The receiving may include receiving geometry information and receiving a plurality of images. The geometry information may be indicative of a variation in geometry of a subject over a time period, the time period may include a plurality of time instants. The plurality of images may be images of the subject at each time instant of the plurality of time instants. Each image may be associated with a respective viewpoint of the subject, and each image may include a view-dependent texture map of the subject that is dependent on a respective viewpoint of the subject. The jointly encoding may be performed by an autoencoder, and may include jointly encoding texture information and the geometry information to provide a latent vector. The inferring may include using the latent vector to infer an inferred geometry of the subject for a predicted viewpoint, and an inferred view-dependent texture of the subject for the predicted viewpoint. The rendering may include rendering a reconstructed image of the subject for the predicted viewpoint using the inferred geometry and the inferred view-dependent texture.

The method may further include conditioning the respective viewpoint associated with each image, and the latent vector may not contain any viewpoint information. The latent vector may include a representation of a facial expression of the subject. The geometry information may include a three-dimensional mesh of the subject that is tracked over the time period. In some embodiments, inferring the inferred geometry and the inferred view-dependent texture may be performed in real-time. Rendering the animated series of reconstructed images of the subject may be performed in real-time. The rendered animated series of reconstructed images may include a VR or AR presentation for display on a VR/AR headset.

In another example, a computer system may include a multi-camera setup, an input module, an autoencoder, and a rendering module. The multi-camera setup may include a plurality of cameras arranged proximate a subject, and each camera may be configured to capture an image of a subject that is associated with a respective viewpoint of the subject. The input module may be configured to receive geometry information and a plurality of images. The geometry information may be indicative of a variation in geometry of a subject over a time period, and the time period may include a plurality of time instants. The plurality of images that are received may be a plurality of images of the subject at each time instant of the plurality of time instants, and each image may be associated with a respective viewpoint of the subject. Each image may include a view-dependent texture map of the subject that is dependent on the respective viewpoint of the subject. The autoencoder may be configured to jointly encode texture information and the geometry information to provide a latent vector. The autoencoder may further be configured to infer, using the latent vector, an inferred geometry of the subject for a predicted viewpoint, and an inferred view-dependent texture of the subject for the predicted viewpoint. The rendering module may be configured to render a reconstructed image of the subject for the predicted viewpoint using the inferred geometry and the inferred view-dependent texture.

In some embodiments, the computer system may be configured to infer the inferred geometry and the inferred view-dependent texture in real-time and render an animated series of reconstructed images of the subject in real-time. The rendered animated series of reconstructed images may include VR or AR presentation for display on a VR/AR headset. The computer system may be configured to learn correspondence between the plurality of images from the multi-camera setup and images from cameras mounted on the VR/AR headset. The computer system may be further configured to use the reconstructed image to re-render a plurality of simulated headset images of the subject, and each simulated headset image may be associated with a viewpoint of a plurality of simulated VR/AR headset cameras. The computer system may be further configured to receive a plurality of received headset images of the subject from a plurality of VR/AR headset cameras, and jointly encode the plurality of simulated headset images and the plurality of received headset images to provide a second latent vector. The computer system may be configured to condition the plurality of simulated headset images and the plurality of received headset images such that the second latent vector does not contain information indicating whether a received headset image is a simulated headset image or a received headset image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
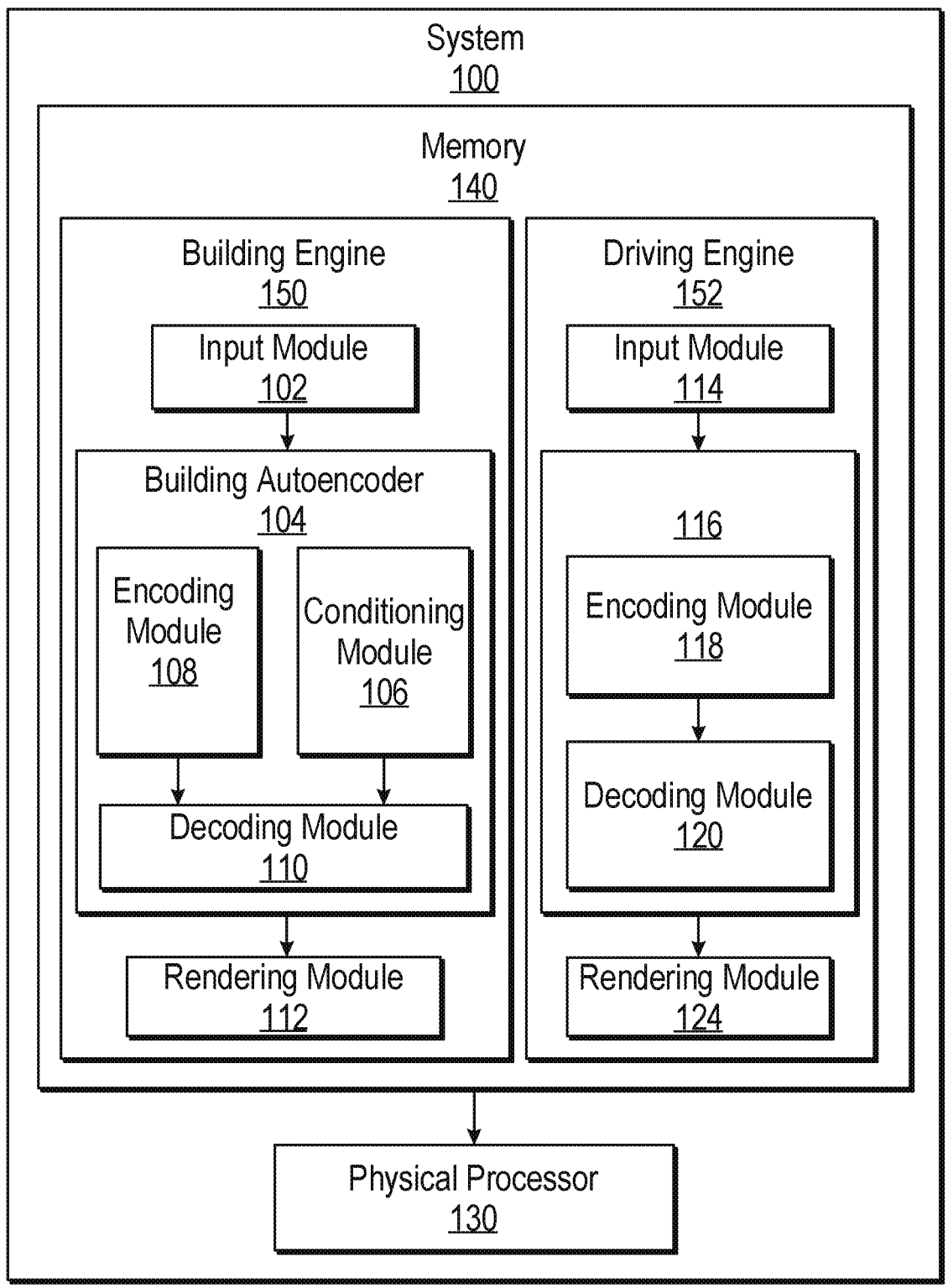
FIG. 1 is a block diagram of an exemplary computer system for building and driving data-driven avatars.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for rendering data-driven avatars with deep appearance models. As will be explained in greater detail below, embodiments of the instant disclosure may provide improved systems and methods for rendering avatars for virtual reality (VR) or augmented reality (AR) presentations.

The disclosed systems may provide deep appearance models for rendering complex avatars, such as human faces. The disclosed systems may be configured to jointly model a variation of geometry and view-dependent textures. For example, the disclosed systems may provide a data-driven rendering pipeline that learns a joint representation of geometry (e.g., facial geometry) and texture. In some examples, an autoencoder, such as a variational autoencoder, may train a deep network to encode and decode geometry information (e.g., vertex positions) and texture information (e.g., texture maps). In addition, the disclosed systems may use a deep appearance model to learn how view-dependent textures change as a function of both viewpoint and facial configuration (e.g., expression, gaze, etc.). In some examples, the deep network may be conditioned on a viewpoint of each texture map at training time so that a viewpoint rendered at inference time may be controlled.

The disclosed systems may use view-dependent textures to model view-dependent effects, such as specularities. Thus, while traditional computer graphics models typically require specifically modeling fine features of the face (e.g., eyelashes, hairs, pores, etc.) to achieve realism, the disclosed systems may train a deep model to predict a joint representation of geometry and texture, thus providing superior rendering.

The disclosed systems may be configured to drive data-driven avatars to make the avatars interactive, for example, for video-driven animation with VR/AR headsets. The disclosed systems may leverage data obtained through the building of the avatar to re-render the subject from points of view of several simulated headset cameras. In some examples, the disclosed systems may learn correspondence between headset data and data captured through a multi-camera setup completely unsupervised. Thus, the disclosed systems may provide a personalized model for rendering an animated avatar to make its texture realistic from the point of view of a user's VR/AR headset.

The term "avatar" may, in some examples, refer to a rendered image of a subject, such as a rendered image of a subject that is animated and interactive within the context of a VR/AR presentation. In some examples, a "subject" may comprise a human face. It should be appreciated, however, that the term "subject" as used herein may encompass any portion or entirety of a human or other animal. Also, the term "subject" as used herein may encompass clothing, plants, and other objects.

The following will provide, with reference to FIG. 1, detailed descriptions of exemplary systems for building and driving data-driven avatars. Detailed descriptions of corresponding computer-implemented methods will also be provided in connection with FIGS. 2-6. Detailed descriptions of an exemplary network environment in which the exemplary systems may be implemented will also be provided in connection with FIG. 7. Detailed descriptions of corresponding pipelines will also be provided in connection with FIGS. 8, 9, and 11. In addition, detailed descriptions of an exemplary architecture for an exemplary autoencoder will be provided in connection with FIG. 10.

FIG. 1 is a block diagram of an exemplary computer system 100 that may be configured to build and drive data-driven avatars. The system 100 may include one or more physical processor 130 and a memory device 140. The memory device 140 may comprise a building engine 150 and a driving engine 152, each containing computer-based instruction modules (e.g., modules 102-124). In certain embodiments, one or more of modules 102-124 may represent one or more software application or programs that, when executed by the processor 130, may cause the processor 130 to perform one or more tasks (e.g., tasks associated with building and driving a data-driven avatar).

In one example, the building engine 150 may be configured to build a deep appearance model for rendering an avatar of a subject. For example, and as described in greater detail below, the building engine 150 may be configured to build a data-driven, three-dimensional morphable model of a subject that jointly models a variation of geometry and view-dependent texture.

The building engine 150 may comprise an input module 102 (building input module 102), a building autoencoder 104, and a rendering module 112 (building rendering module 112). The input module 102 may be configured to receive input, which may include geometry information and view-dependent texture information of a subject. In addition, the building autoencoder 104 may be configured to jointly encode the texture information (e.g., view-independent texture information) and the geometry information to provide a latent vector z (first latent vector z). The rendering module 112 may be configured to use the latent vector z to predict an inferred geometry and an inferred view-specific texture map of the subject.

In some examples, the geometry information may be indicative of a variation in geometry of the subject over a time period. In certain embodiments, the geometry information may comprise a three-dimensional mesh of the subject that is tracked over time. Additional details on exemplary systems and methods for obtaining a tracked three-dimensional mesh of the subject will be described in further detail below with reference to FIG. 7.

In one example, the view-dependent texture information may be dependent on a respective viewpoint of the subject.

For example, in collecting the view-dependent texture information, the input module 102 may receive a plurality of images of the subject at each time instant over the time period, and each image may be associated with a respective viewpoint of the subject. The plurality of images of the subject may be captured by a multi-camera setup, the details of which will be explained in further detail below with reference to FIG. 7. The view-dependent texture information may comprise a plurality of view-specific texture maps that are associated with the plurality of images. For example, each view-specific texture map may be derived from an individual camera in the multi-camera setup.

Upon tracking the three-dimensional mesh of the subject overtime, the three-dimensional mesh may be unwrapped into view-specific texture maps for each of the plurality of images. In certain embodiments, a ray may be traced from a respective camera to each texel of the texture map, and the image pixel value may be copied into the pixel map if the ray is not occluded. It should be appreciated that, at test time, the building engine 150 may learn to reconstruct these view-specific texture maps, as further described below.

The building autoencoder 104 may include an encoding module 108 (building encoding module 108) and a decoding module 110 (building decoding module 110). In certain embodiments, the building autoencoder 104 may be a conditional autoencoder and include a conditioning module 106 that is configured to condition at least one conditioning variable, and the decoding module 110 may be conditioned on the at least one conditioning variable. In some embodiments, the at least one conditioning variable may include a respective viewpoint associated with each image (e.g., a view vector of the camera from which the view-specific texture map was unwrapped). Thus, the conditioning module 106 may be configured to condition the view-specific texture maps such that the texture information that is encoded by the encoding module 108 is independent of viewpoint. Thus, the encoding module 108 may provide a latent vector z that does not contain any viewpoint information. By providing a latent vector that does not contain any viewpoint information, the system 100 may predict a view-specific texture map from any arbitrary view. Thus, at test time, the system 100 may generate appropriate texture for a viewer's point of view, relative to the position and orientation of the avatar.

In embodiments in which the conditioning module 106 conditions the network on viewpoint, input module 102 may be configured to provide a view-specific texture map that is averaged over all the view-specific texture maps.

In addition or as an alternative to viewpoint conditioning, the conditioning module 106 may be configured to condition the network on other suitable properties in order to control the other properties at test time. For example, the conditioning module may be configured to condition the network on illumination, speech, identity, gaze, etc.

The encoding module 108 may be configured to receive and jointly encode the texture information (e.g., the view-independent texture map) and the geometry information to provide a latent vector z. In certain embodiments, the building encoding module 108 may be configured to learn to compress the joint variation of texture and geometry into a latent encoding.

The decoding module 110 may be configured to use the latent vector z to infer, for a predicted viewpoint, an inferred geometry of the subject, and an inferred view-dependent texture of the subject. For example, the decoding module 110 may use the latent vector z to reconstruct view-specific texture maps and a three-dimensional mesh of the subject. The decoding module 110 may receive as input the latent vector z and a view vector. In certain embodiments, the view vector may be relative to a rigid orientation of the subject that is estimated using a tracking algorithm. The decoding module 110 may transform the latent vector z and the view vector into reconstructed view-specific texture maps and a reconstructed three-dimensional mesh. Thus, in instances in which the subject is a human face, the decoding module 110 may be configured to translate facial encodings and viewpoint into geometry and appearance texture.

In embodiments comprising a conditioning module 106 that is configured to make the texture information viewpoint independent, the decoding module 110 may be configured to rely on the view vector to supply all the information about the viewpoint. Thus, the decoding module 110 may be configured to learn to produce view-specific texture maps from any view, including views that were not captured during the multi-camera setup.

The rendering module 112 may be configured to use the reconstructed texture maps and the reconstructed three-dimensional mesh of the subject to render a reconstructed image of the subject, thus providing a data-driven avatar of the subject. Thus, while traditional systems may require a prediction of albedo, specular, etc., to enable relighting, the disclosed systems may directly predict a shaded appearance as output.

The driving engine 152 may be configured to drive a data-driven avatar (e.g., the avatar built by the building engine 150) to make the avatar animated and interactive in real-time from a viewpoint of a user's VR/AR headset. For example, the driving engine 152 may be configured to render animated faces in real-time and perform video-driven animation from various users' VR/AR headset cameras. In certain embodiments, the driving engine 152 may leverage data that was created during a multi-camera setup to re-render the subject from points of view of several VR/AR headsets. The driving engine 152 may be configured to automatically associate a configuration of the subject in a user's VR/AR headset with a configuration of the subject in the multi-camera setup. For example, in instances in which the subject is a human face, the driving engine 152 may be configured to automatically associate a person's facial configuration in a user's VR/AR headset with the person's facial configuration in the multi-camera setup. The driving engine 152 may make this automatic association by reconstructing inputs based on finding a common representation of the VR/AR headset images and images captured by the multi-camera setup. The driving engine 152 may comprise a driving input module 114, a driving autoencoder 116, and a driving rendering module 124.

The driving input module 114 may be configured to receive a reconstructed image of the subject from the building rendering module 112, and may also receive a plurality of headset images from a plurality of VR/AR headsets. The driving input module 114 may be configured to use a reconstructed image to render a plurality of simulated headset images of the subject, and each simulated headset image may be associated with a respective viewpoint of each VR/AR headset of the plurality of simulated VR/AR headsets. In some embodiments, approximate intrinsic and extrinsic headset camera parameters may be computed, and this computation may be performed by hand for one frame and propagated for a tracked head pose. For each pixel of a simulated headset image, the driving input module 114 may raycast into the tracked geometry and project that point into one or more of the multi-camera images to obtain a color value. Thus, the driving input module 114 may produce, from data obtained from the multi-camera setup, simulated headset images from the perspective of the VR/AR headsets.

The driving autoencoder 116 may comprise a driving encoding module 118 and a driving decoding module 120. The driving encoding module 118 be configured to jointly encode the plurality of simulated headset images and the plurality of received headset images to provide a second latent vector y. In addition, the driving decoding module 120 may be configured to produce a headset frame from the second latent vector y and an indicator variable R. The indicator variable R may indicate whether the driving decoding module 120 should decode a received ("real") headset frame or a simulated ("synthetic") headset frame. Thus, in some embodiments, the second latent vector y may not contain any modality-specific information indicating whether a headset image is real or synthetic.

In certain embodiments, the encoding module 118 may be configured to resolve differences in lighting between the multi-camera setup and the VR/AR headset images. For example, the encoding module 118 may be configured to learn correspondence between the images captured by the multi-camera setup and the headset images obtained with the VR/AR headset cameras. The encoding module 118 may also be configured to re-render the images captured by the multi-camera setup to appear like they are from the points of view of respective VR/AR headset cameras. The encoding module 118 may learn such correspondence in a completely unsupervised way by jointly encoding the two sets of images. In certain embodiments, the encoding module 118 may learn a semantically-consistent common representation of both sets of images by utilizing weight sharing and a Gaussian prior on the latent space. The driving autoencoder 116 may be configured to learn to encode and decode the simulated headset images and the received headset images to provide the second latent vector y, and the Gaussian prior of the autoencoder may encourage the second latent vector y to form a common representation of both sets of images. The decoding module 112 may be conditioned on a binary value indicating whether the headset image was from the set of simulated headset images or the set of received headset images, such that this modality-specific information is not contained in the second latent vector y. Thus, because the driving autoencoder 116 may learn correspondence between the images from the simulated headset images and the multi-camera setup, the autoencoder 116 may learn a linear transformation that maps the second latent vector y to the first latent vector z for the synthetic headset images. Also, because the driving autoencoder 116 may learn a common, semantically-correct representation between received ("real") headset images and simulated ("synthetic") headset images, the linear regression may generalize to real headset images.

In one example, the building autoencoder 104 may be configured to output a shaded appearance texture. In addition, the driving rendering module 124 may be configured to use the second latent vector y to provide a driven avatar and make the avatar interactive for display in real-time for VR/AR presentations. In some embodiments, the avatar may be displayed using triangle rasterization. The system 100 may be configured to perform high-fidelity, real-time tracking from cameras mounted on a VR/AR headset by doing automatic correspondence between headset images and the images captured in the multi-camera setup. Thus, the instant disclosure may train deep neural networks to provide improved rendering and driving of avatars for interactive VR/AR presentation.

Figure 2:
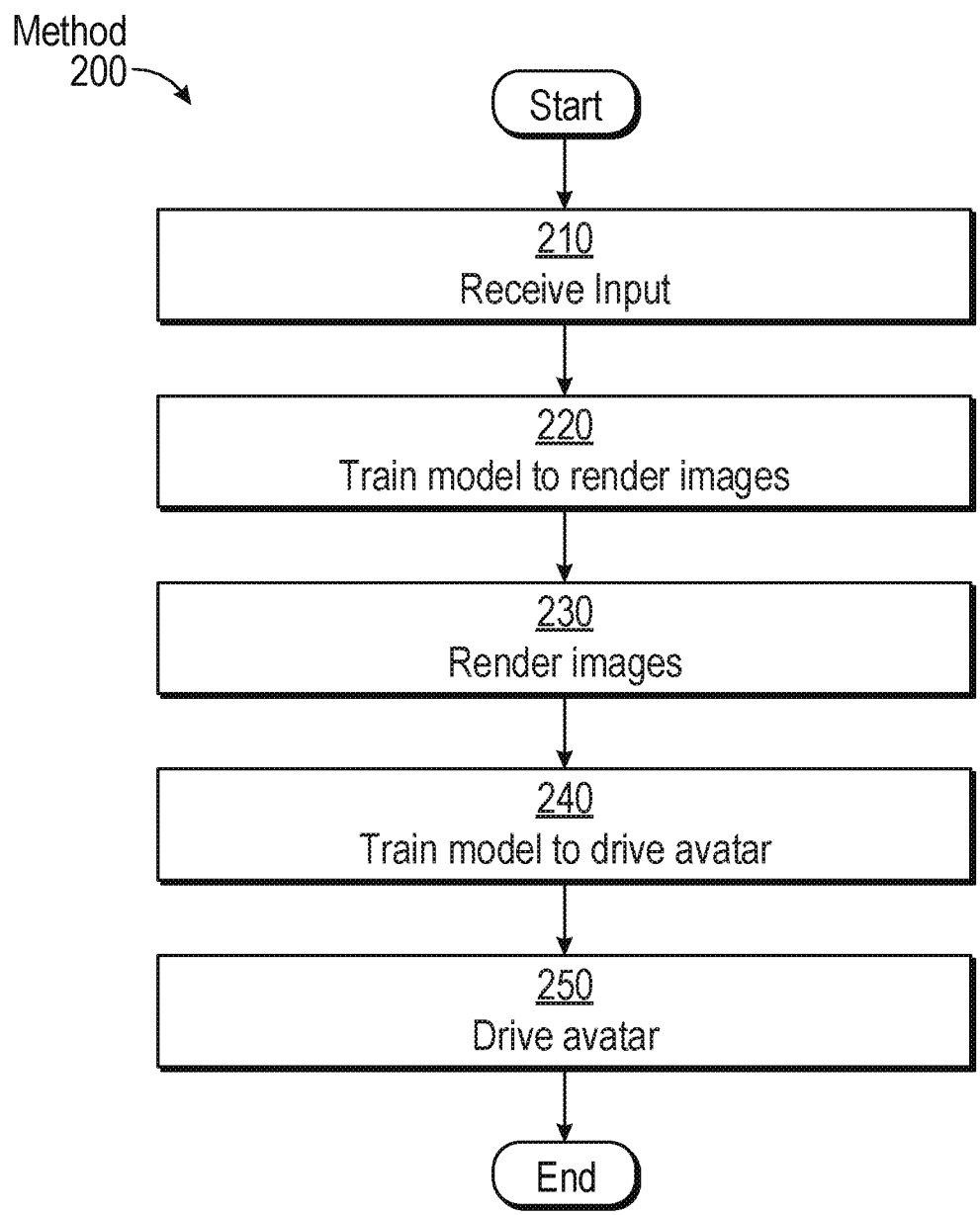
FIG. 2 is a flow diagram of an exemplary method for building and driving a data-driven avatar.

FIG. 2 is a flow diagram of an exemplary computer-implemented method 200 for building and driving a data-driven avatar. The steps shown in FIG. 2 may be performed by any suitable computer-executable code and/or computing system, including the systems illustrated in FIGS. 1 and 7. In some examples, each of the steps shown in FIG. 2 may represent an algorithm whose structure includes and/or is represented by multiple sub-steps, examples of which will be provided in greater detail below.

At step 210, the systems described herein may receive input. For example, the building input module 102 may receive geometry information and a plurality of images comprising view-dependent texture information. At step 220, the systems described herein may use the received input to train a model to render images. For example, the building autoencoder 104 may jointly encode texture information and the geometry information to provide a latent vector z (first latent vector z). To train the model, the building autoencoder 104 may infer, using the latent vector z, an inferred geometry of the subject for a predicted viewpoint, and an inferred view-dependent texture of the subject for the predicted viewpoint. At step 230, the systems described herein may render reconstructed images of the subject to provide an avatar, for example, using the inferred geometry and the inferred view-dependent texture. At step 240, the systems described herein may train a model to drive the avatar. At step 250, the systems described herein may drive the avatar, for example, to provide an animated, interactive VR/AR presentation of the avatar.

Figure 3:
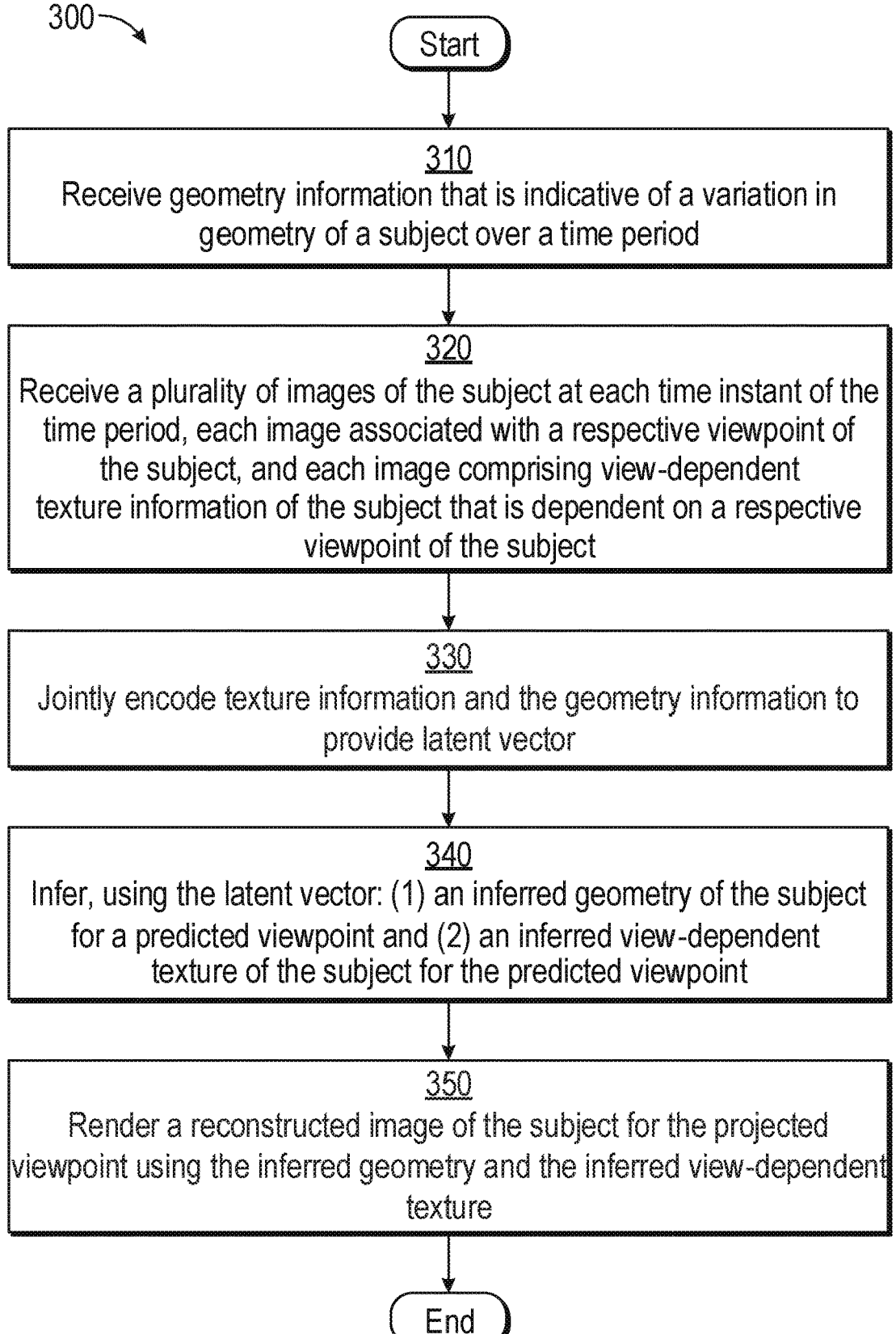
FIG. 3 is a flow diagram of an exemplary method for building a data-driven avatar.

FIG. 3 is a flow diagram of an exemplary method 300 for building a data-driven avatar. In some examples, the steps shown in FIG. 3 may be performed by any suitable computer-executable code and/or computing system, including the building engine 150 illustrated in FIGS. 1 and 7. In some examples, each of the steps shown in FIG. 3 may represent an algorithm whose structure includes and/or is represented by multiple sub-steps, examples of which will be provided in greater detail below.

At step 310, the systems described herein may receive geometry information that is indicative of a variation in geometry of a subject over a time period. At step 320, the systems described herein may receive a plurality of images of the subject (e.g., images captured through the multi-capture setup) at each time instant of the time period. Each image may be associated with a respective viewpoint of the subject, and each image may comprise view-dependent texture information of the subject that is dependent on a respective viewpoint of the subject. At step 330, the systems described may jointly encode texture information and the geometry information to provide a latent vector. In some embodiments, the jointly encoded texture information may be conditioned such that the texture information is independent of viewpoint, as described in further detail below with reference to FIG. 4. At step 340, the systems described herein may use the latent vector to infer, for a predicted viewpoint, an inferred geometry of the subject and an inferred view-dependent texture of the subject. At step 350, the systems described herein may render a reconstructed image of the subject for the predicted viewpoint using the inferred geometry and the inferred view-dependent texture.

Figure 4:
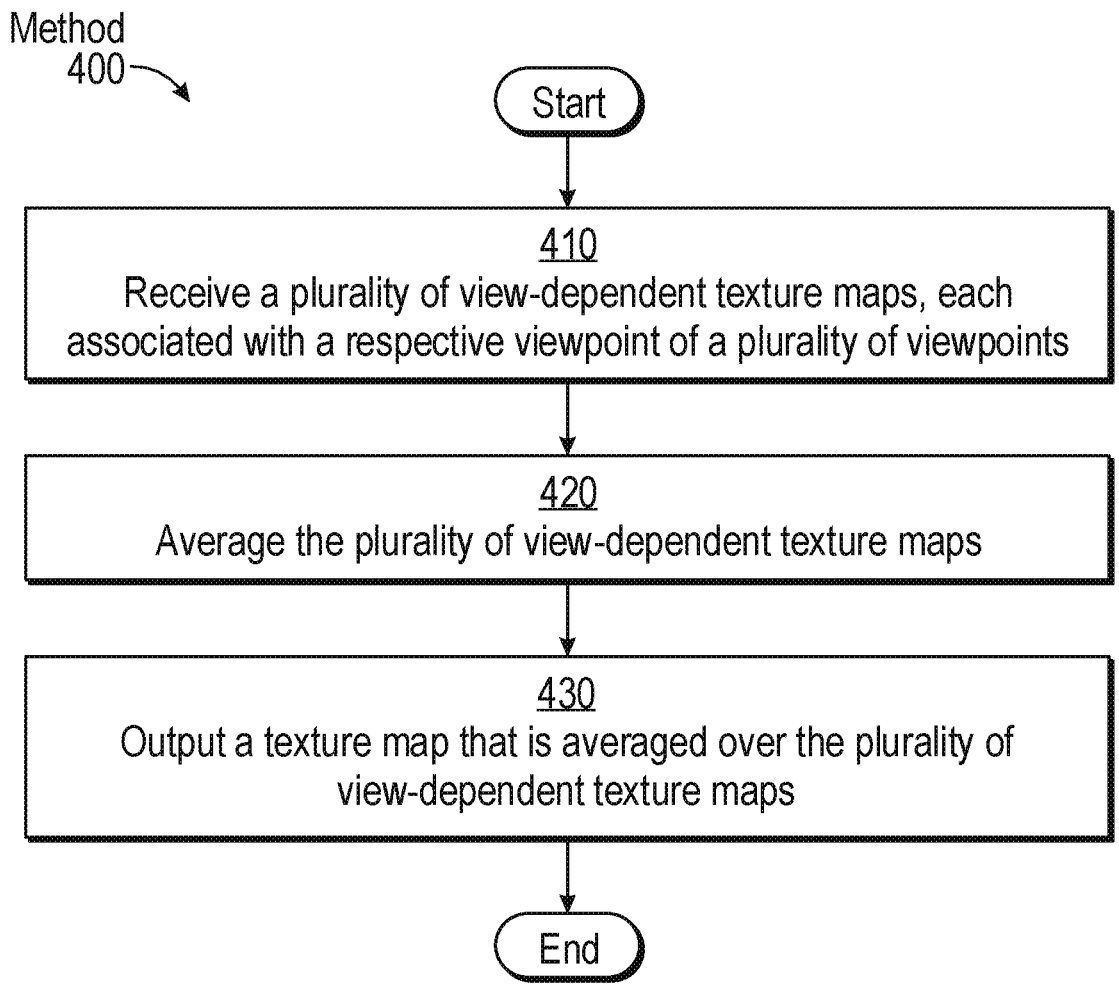
FIG. 4. Is a flow diagram of an exemplary method for processing texture information.

FIG. 4. Is a flow diagram of an exemplary method 400 for processing texture information. In some embodiments, the systems described herein may process view-dependent texture information to make it independent of viewpoint, and the autoencoder may encode the view-independent texture information. The steps shown in FIG. 4 may be performed by any suitable computer-executable code and/or computing system, including the building engine 150 (e.g., the conditioning module 106) illustrated in FIGS. 1 and 7. In some examples, each of the steps shown in FIG. 4 may represent an algorithm whose structure includes and/or is represented by multiple sub-steps, examples of which will be provided in greater detail below.

At step 410, the systems described herein may receive a plurality of view-specific texture maps. Each view-specific texture map may be associated with a respective viewpoint of a plurality of viewpoints. At step 420, the systems described herein may average the plurality of view-specific texture maps. At step 430, the systems described herein may output a view-independent texture map that is averaged over the plurality of view-specific texture maps.

Figure 5:
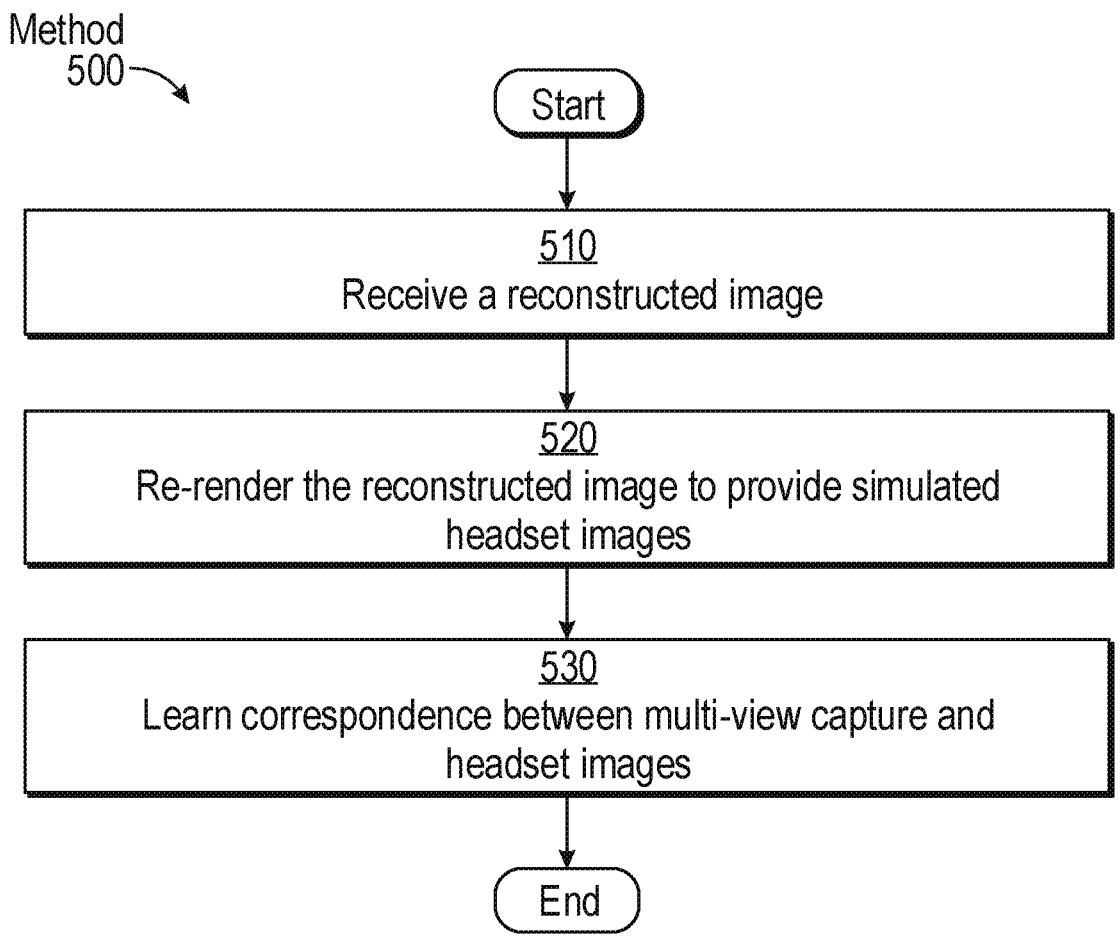
FIG. 5 is a flow diagram of an exemplary method for providing simulated headset images and learning correspondence between images captured with a multi-view setup and headset images.

FIG. 5 is a flow diagram of an exemplary method 500 for providing simulated headset images and learning correspondence between images captured by a multi-view setup and headset images. The steps shown in FIG. 5 may be performed by any suitable computer-executable code and/or computing system, including the driving engine 152 illustrated in FIGS. 1 and 7. In certain embodiments, the steps shown in FIG. 5 may be performed by a suitable system prior to performing the steps shown in FIG. 6. In some examples, each of the steps shown in FIG. 5 may represent an algorithm whose structure includes and/or is represented by multiple sub-steps, examples of which will be provided in greater detail below.

At step 510, the systems described herein may receive a reconstructed image, for example, from the building rendering module 112. At step 520, the systems described herein may re-render the reconstructed image to provide a plurality of simulated ("synthetic") headset images. At step 530, the systems described herein may learn correspondence between the images captured by the multi-view setup and the headset images.

Figure 6:
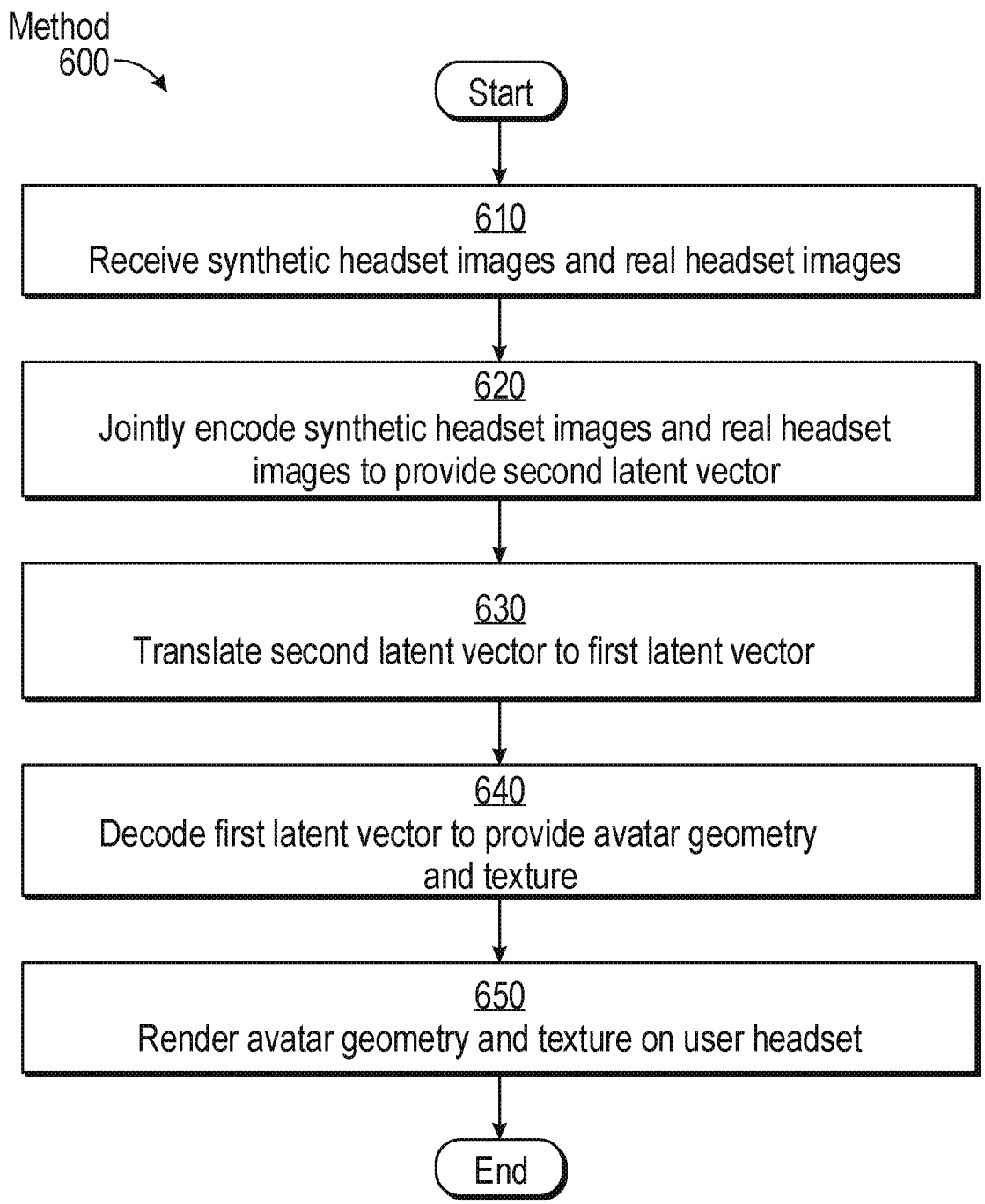
FIG. 6 is a flow diagram of an exemplary method for driving a data-driven avatar.

FIG. 6 is a flow diagram of an exemplary method 600 for driving a data-driven avatar. The steps shown in FIG. 6 may be performed by any suitable computer-executable code and/or computing system, including the driving autoencoder 116 illustrated in FIGS. 1 and 7. In some examples, each of the steps shown in FIG. 6 may represent an algorithm whose structure includes and/or is represented by multiple sub-steps, examples of which will be provided in greater detail below.

At step 610, the systems described herein may receive synthetic headset images and real headset images. At step 620, the systems described herein may jointly encode the synthetic headset images and the real headset images to provide a second latent vector y. At step 630, the systems described herein may translate the second latent vector y to the first latent vector z. At step 640, the systems described herein may decode the first latent vector z to provide avatar geometry and texture. At step 650, the systems described herein may render driven, interactive avatar geometry and texture on a user VR/AR headset.

Figure 7:
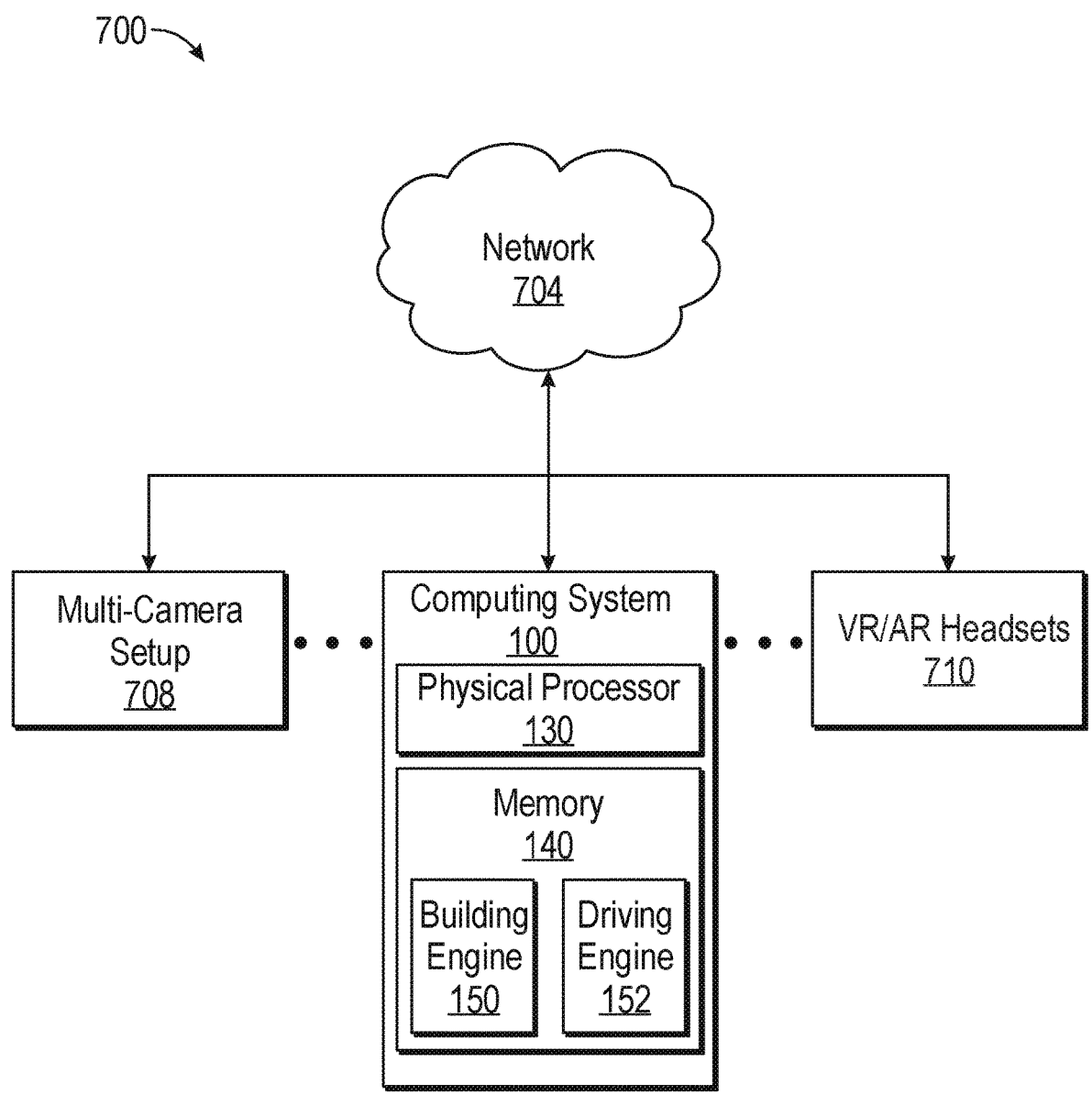
FIG. 7 is a block diagram of an exemplary network environment in which an exemplary system for building and driving data-driven avatars may be implemented.

FIG. 7 is a block diagram of an exemplary network environment 700 in which the exemplary system 100 for building and driving data-driven avatars may be implemented. The environment 700 may comprise the system 100, a multi-camera setup 708, a plurality of user VR/AR headsets 710, and a network 704. The computer system 100, multi-camera setup 708, and VR/AR headsets 710 may be communicatively coupled to one another, for example, via the network 704. The network 704 may be any suitable communication network, such as the Internet, a Wide Area Network (WAN), or a Local Area Network (LAN), and may include various types of communication protocols and physical connections.

The multi-camera setup 708 may be configured to collect a large amount of data of the subject, for example, by enabling synchronized, high-resolution, multi-view video capture of the subject. The multi-camera setup 708 may record the subject from a plurality of cameras simultaneously. In instances in which the subject is a human face, the multi-camera setup 708 may comprise forty (or any other suitable number of) cameras positioned around the face. In one example, about 70% of the cameras may be positioned to capture the front of the face, with the rest sparsely placed around the back and sides of the face to capture the overall shape of the head. In this example, the cameras may be configured to capture 5120×3840 images at 30 frames per second synchronously, although other values are also possible. The cameras may comprise any suitable type of lens. For example, in instances in which the subject comprises a human face, the multi-camera setup may comprise 50 mm lenses that are zoomed into the face to capture details of the pores in the skin. The cameras may be placed at any suitable distance from the subject, including, for example, about one meter from the face. Lights, such as LED lights, may also be positioned around the subject to provide a uniform appearance of the subject.

In some embodiments, the multi-camera setup 708 may include a plurality of cameras attached to and/or disposed within a dome dimensioned to surround at least part of the subject while the multi-camera setup 708 collects data for the subject. In one example, the dome may be opaque (e.g., opaque and white in color) to provide even lighting within the dome. Light sources may provide various light conditions during the capture operations performed by the multi-camera setup 708. For example, light sources may provide different light colors, different levels of brightness, and/or different light angles. The light conditions may be determined based on which features of the subject are to be captured by the multi-camera setup 708. For example, in instances in which the subject is a human face, light colors may be selected based on skin tone, levels of brightness may be selected based on skin washout or eye delicacy issues, light angles may be selected for emphasizing particular portions of the face, and so on. In some embodiments, the light sources may be attached to and/or disposed within a dome that houses the cameras of the multi-camera setup 708.

In some embodiments, the light conditions may change dynamically throughout the capture operations performed by the multi-camera setup 708. The systems described herein may also use the dynamic light conditions as input in the model, which may allow the systems described herein to prescribe a particular lighting environment when rendering the avatar.

In instances in which the subject is a human face, it may be advantageous to make the distribution of facial expressions consistent from person to person. Thus, in collecting data during the multi-camera setup 708, each human subject may make a predefined set of facial expressions, and each human subject may recite a predefined set of phonetically balanced sentences.

To provide the tracked three-dimensional mesh, the building engine 150 may use images captured from the multi-camera setup 708 and a reconstructed three-dimensional mesh of the subject to track the subject through time. For example, blendshape basis may be performed by manually fitting a template three-dimensional mesh to the reconstructions of each configuration of the subject (e.g., each facial expression image). The building engine 150 may then perform blendshape tracking by fitting the blendshape basis to both the reconstructed three-dimensional mesh and the image appearance. In this example, the building engine 150 may assume that the three-dimensional mesh of the subject has a consistent topology over time.

In some examples, the systems and methods described herein may conserve bandwidth resources by distributing encoding and decoding processes among a variety of devices. For example, as described above, multi-camera setup 708 in FIG. 7 may collect raw data and then transfer the collected raw data via network 704 to computing system 100. Various components of computing system 100 (e.g., build engine 150) may then jointly encode texture information and geometry information to provide a latent vector. Computing system 100 may then send the latent vector to at least one of headsets VR/AR headsets 710, which may then decode the latent vector to provide avatar geometry and texture, and may then render avatar geometry and texture. In other words, the systems and methods described herein may transfer bandwidth-intensive raw data (e.g., raw video data collected via multi-camera setup 708) from multi-camera setup 708 to computing system 100 via network 704 for encoding, while transferring a less bandwidth-intensive latent vector from computing system 100 to VR/AR headsets 710 for decoding and/or rendering. By doing so, the disclosed systems may conserve considerable bandwidth resources over conventional systems that transfer bandwidth-intensive, high-quality rendered data to VR/AR headsets. Thus, the systems and methods described herein may conserve bandwidth resources while maintaining high-quality rendering of three-dimensional objects.

Figure 8:
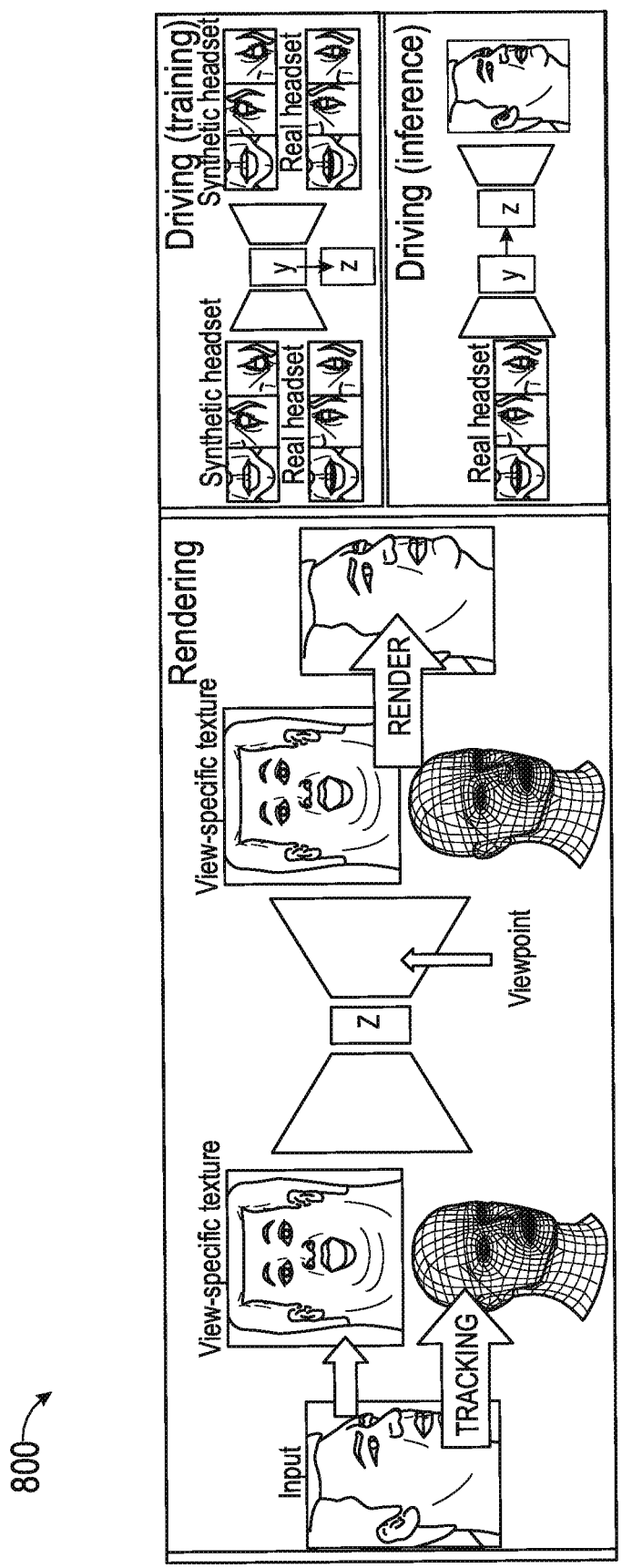
FIG. 8 is a schematic representation of an exemplary pipeline for building and driving a data-driven avatar.

FIG. 8 is a schematic representation of an exemplary pipeline 800 for building and driving a data-driven avatar. The operations shown in FIG. 8 may be performed by any suitable computer-executable code and/or computing system, including the systems 100 illustrated in FIGS. 1 and 7. The details of the pipeline represented in FIG. 8 are described in further detail below with respect to FIGS. 9 and 11.

Figure 9:
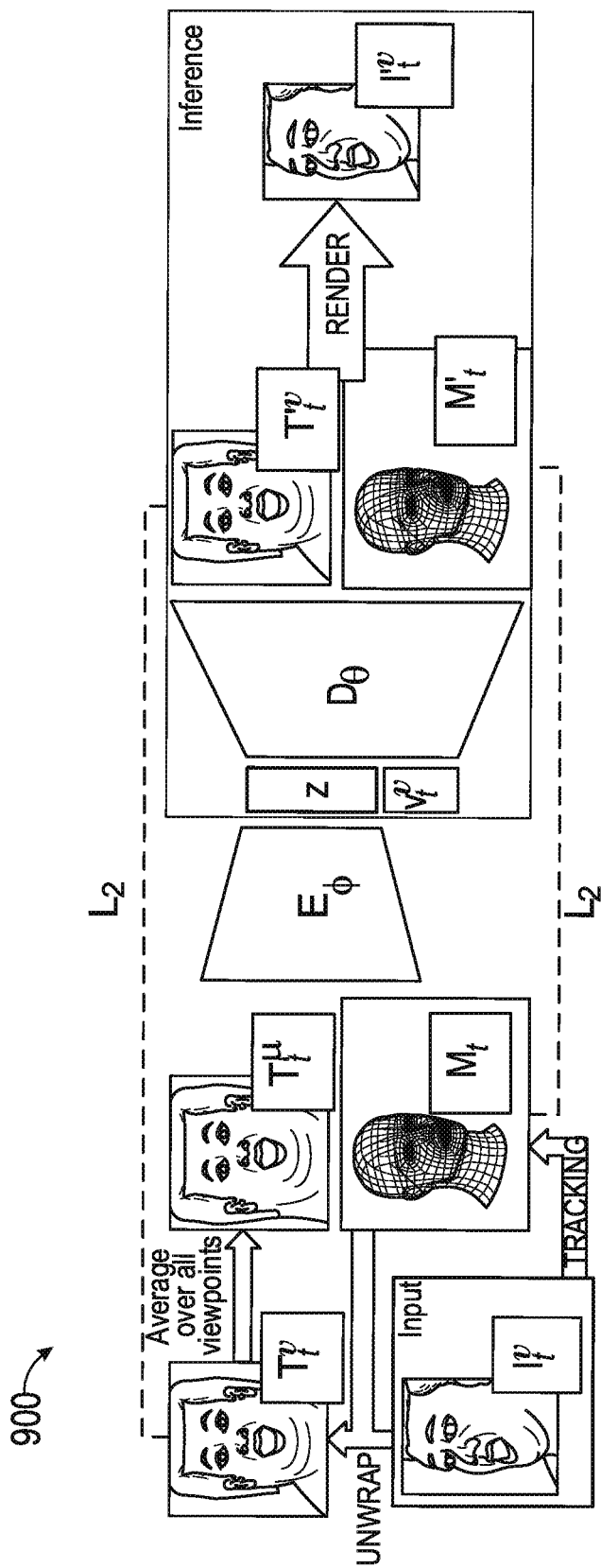
FIG. 9 is a schematic representation of an exemplary pipeline for building a data-driven avatar.

FIG. 9 is a schematic representation of an exemplary pipeline 900 for building a data-driven avatar. The operations shown in FIG. 9 may be performed by any suitable computer-executable code and/or computing system, including the building engine 150 and other systems described and illustrated in FIGS. 1 and 7. In certain embodiments, $I_t^v$ may be an image from a multi-camera setup (e.g., multi-camera setup 708 shown in FIG. 7) at time instant t from camera v. In some examples, there may be V=40 cameras (or any other suitable number V of cameras) in the multi-camera setup. The view vector may be assumed to be relative to a rigid orientation of the subject (e.g., the rigid head orientation) that is estimated from a tracking algorithm. $M_t$ may be a three-dimensional mesh at each time instant with a consistent topology over time. Using the image and mesh, the systems described herein may unwrap a view-specific texture map $T_t^v$ by casting rays through each pixel of the geometry and assigning the intersected texture coordinate to the color of the image pixel. The systems described herein may also condition the network by establishing the average texture in accordance with $$T_t^\mu = \frac{\sum_{v=1}^{V} w_t^v \odot T_t^v}{\sum_{v=1}^{V} w_t^v},$$ (Equation 1)

where $w_t^v$ is a factor indicating whether each texel is occluded (0) or unoccluded (1) from camera v, and ⊙ may represent an element-wise product. During training, the systems described herein may take the tuple $(T_t^\mu, M_t)$ as input and $(T_t^v, M_t)$ as the target, to prevent the latent space from containing view information and to enable a canonical latent state for each time instant.

The systems described herein (e.g., building autoencoder 104) may learn to jointly compress and reconstruct the texture $T_t^v$ and $M_t$ mesh vertices. In certain embodiments, the systems described herein may comprise a building autoencoder 104 that may include two halves: an encoder $E_\phi$ (e.g., encoding module 106) and a decoder $D_\phi$ (e.g., decoding module 110). The encoder $E_\phi$ may take as input the texture and mesh vertices and output a distribution over a latent space, $$\mu_t^z, \log \sigma_t^z \leftarrow E_\phi(T_t^\mu, M_t), \quad \text{(Equation 2)}$$

where the function $E_\phi$ is defined as a deep neural network with parameters $\phi$. At training time, the systems described herein (e.g., building autoencoder 104) may sample from the distribution, $$z_t \sim \mathcal{N}(\mu_t^z, \sigma_t^z), \quad \text{(Equation 3)}$$

and the systems described herein may pass the distribution to the decoder $D_\phi$ (decoding module 110) and compute the loss to perform an expectation over the distribution defined by the encoder $E_\phi$ (encoding module 106). The vector $z_t$ may be a data-driven low-dimensional representation of a subject's configuration (e.g., a subject's facial expression). The vector $z_t$ may encode all aspects of the subject; for example, all aspects of the face, from eye-gaze direction to mouth and tongue expression.

The decoder $D_\phi$ may transform the latent code and the view vector $v_t^v$ into a reconstructed texture and mesh in accordance with $$\hat{T}_t^v, \hat{M}_t \leftarrow (z_t, v_t^v), \quad \text{(Equation 4)}$$

where $\hat{T}_t^v$ is the reconstructed texture and $\hat{M}_t$ is the reconstructed geometry. Upon decoding, the systems described herein may use the texture, mesh, and camera pose to render a final reconstructed image $\hat{I}_t^v$.

Figure 10:
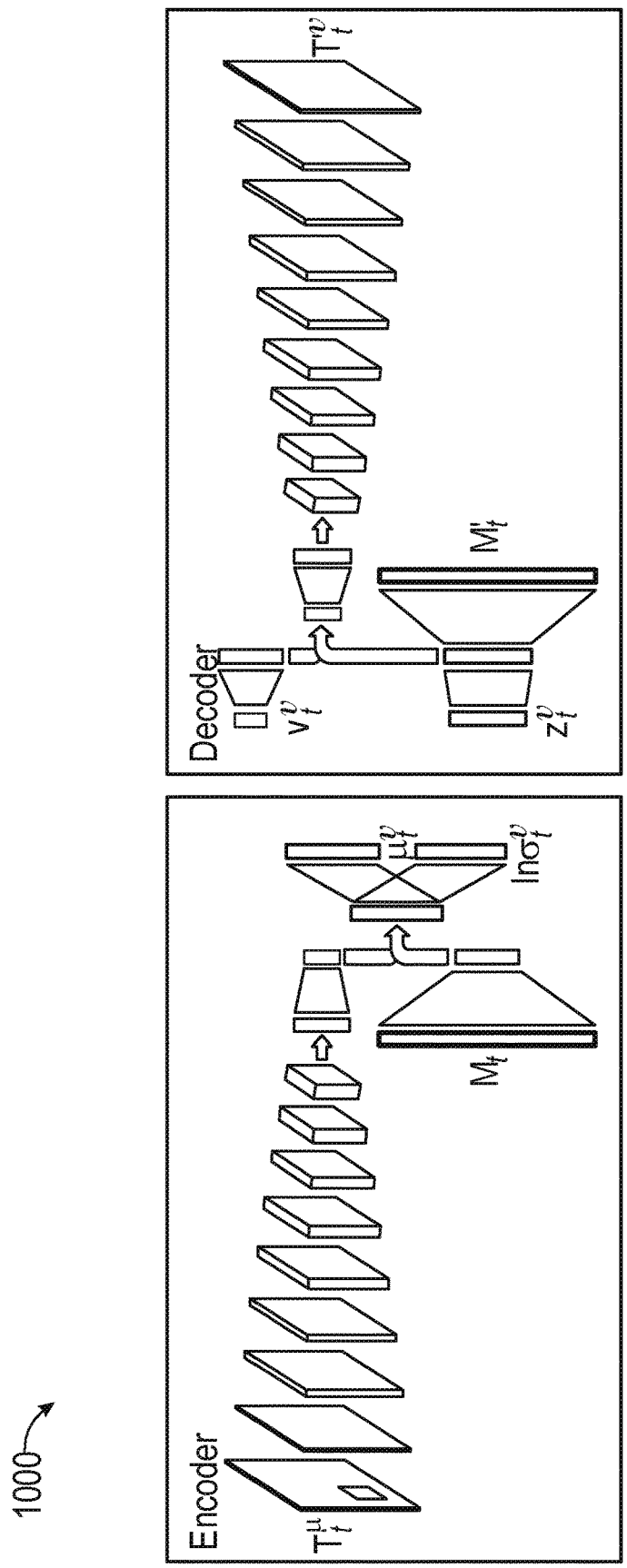
FIG. 10 is a schematic representation of an exemplary architecture for an exemplary building autoencoder.

FIG. 10 is a schematic representation of an exemplary architecture 1000 for an exemplary autoencoder, such as the building autoencoder 104 illustrated in FIGS. 1 and 7. In certain embodiments, conditioning may be performed by concatenating a conditioning variable to the first latent vector z after each passes through a single layer. In some examples, the three-dimensional mesh may be independent of viewpoint, and the three-dimensional mesh may only be a function of the latent vector z. The texture decoder subnetwork may comprise a series of transposed strided convolutions (which may be referred to as deconvolutions) to increase the output resolution. In one example, the decoder network may be able to run in less than about 11.1 milliseconds in order to achieve 90 Hz rendering for real-time VR/AR systems. The autoencoder may achieve real-time rendering using transposed strided convolutions with a final texture size of 1024×1024, for example.

The texture maps may have non-stationary statistics that may be exploited to improve the network design. For example, each convolutional layer may have a bias that varies with both channel and spatial dimension, which may improve reconstruction error and visual fidelity.

To train the building autoencoder 104, the systems described herein may minimize the $L_2$-distance between the input texture and geometry and the reconstructed texture and geometry plus the KL-divergence between the prior distribution (e.g., an isometric Gaussian) and the distribution of the latent space, $$l(\phi) = \Sigma_{v,t} \lambda_T \|w_t^v \odot (T_t^v - \hat{T}_t^v)\|^2 + \lambda_M \|M_t - \hat{M}_t\|^2 + \lambda_Z KL( \\ \mathcal{N}(\mu_t^z, \sigma_t^z) \| \mathcal{N}(0, I)), \quad \text{(Equation 5)}$$

where $w_t^v$ is a weighting term to ensure the loss does not penalize missing data (e.g., areas of the subject that are not captured by the multi-camera setup) and $\lambda$ may represent a weighting term associated with each term (e.g., $\lambda_T$, $\lambda_M$, and $\lambda_Z$). Before training, the texture and geometry may be standardized such that the texture and geometry have a zero mean and unit variance.

During test time, the decoder may translate the first latent vector z (which may represent facial encodings) and the view vector v into geometry and appearance texture. In one example, the systems described herein may be configured to perform such translation in less than about 11.1 milliseconds (e.g., in approximately 5 milliseconds).

In some embodiments, the systems described herein may be configured to decode twice, creating texture for each eye. The network may be configured to generalize viewpoint sufficiently such that the small difference in viewpoint between the two eyes noticeably improves the experience. This may be particularly advantageous in rendering the teeth and tongue, and may give the impression of depth inside the mouth.

In some embodiments, when training the building autoencoder 104, the systems described herein may utilize various machine learning techniques. For example, the systems described herein may obtain a set of training samples (i.e., a training set) for training the building autoencoder 104. A training sample may include one or more images of a subject (e.g., of a person's face) captured in the multi-camera setup, as well as a known three-dimensional model of the subject. The known three-dimensional model may include geometry and view-dependent texture information of the subject. Various training samples may correspond to different individual subjects. In some embodiments, a training set may include images from other sources, such as online sources, including social media websites and applications, blogs, etc.

In some embodiments, the model may comprise a neural network made up of layers of interconnected nodes with weighted connections (e.g., parameters) between the nodes. During training, the systems described herein may determine values of parameters (e.g., weights and biases) of the model based on the training set. The model may be represented by a plurality of features, and each feature may be associated with a weight. The systems described herein may extract features from the training set, and the features may be variables deemed potentially relevant to defining the subject. For example, in instances in which the subject is a human face, the features may include facial expression, head shape, skin texture, skin tone, eye color, eye orientation, eye gaze, and mouth, lip, and tongue position, shape, and configuration, etc. In some embodiments, the systems described herein may extract a plurality of features from the training set, and each feature may be associated with a respective weight of a plurality of weights. Features deemed more important in defining the three-dimensional model of the subject may be associated with a higher weight. The systems described herein may train the model using the plurality of extracted features, and may establish a subset of the plurality of extracted features to provide latent vector z. For example, latent vector z may comprise a 128-dimensional latent vector, which may be a subset of the plurality of extracted features used to train the model.

Figure 11:
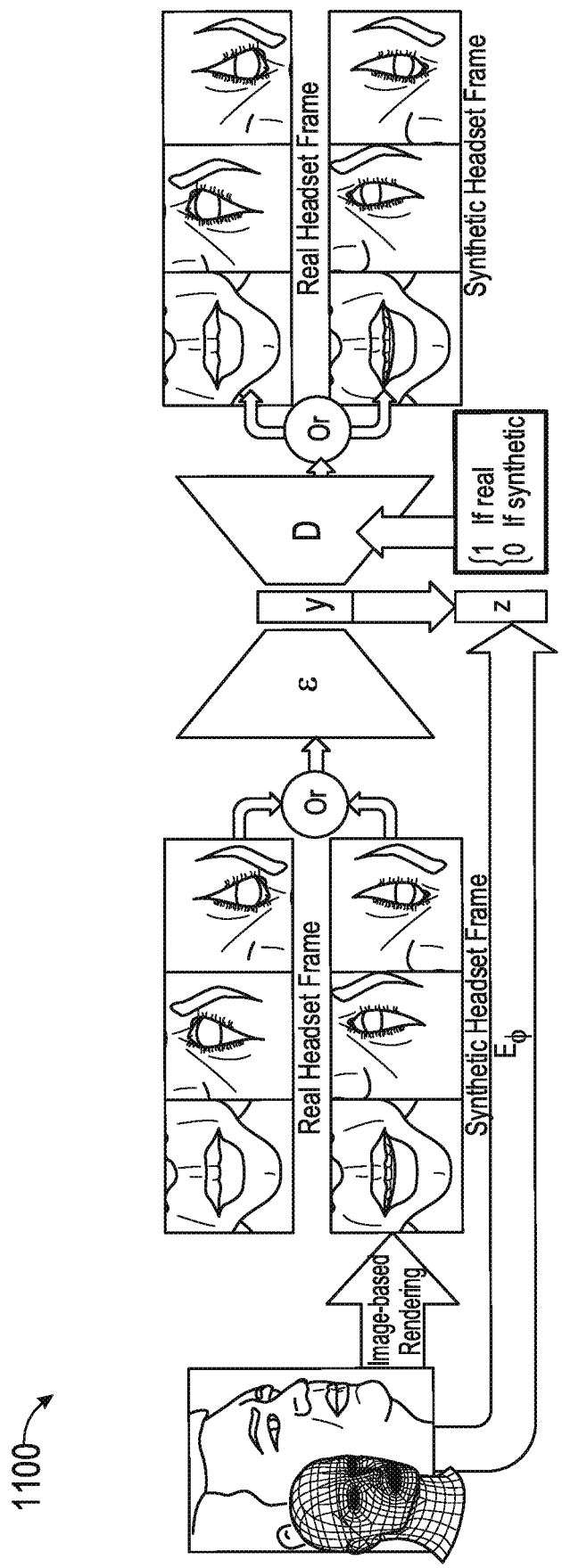
FIG. 11 is a schematic representation of an exemplary pipeline for driving a data-driven avatar.

FIG. 11 is a schematic representation of an exemplary pipeline 1100 for driving a data-driven avatar. The operations shown in FIG. 11 may be performed by any suitable computer-executable code and/or computing system, including the driving engine 152 and other systems illustrated in FIGS. 1 and 7. In some examples, an encoder ε (e.g., encoding module 118) may take one headset frame $H_t$ that includes three images, mouth $H_t^m$, left eye $H_t^l$, and right eye $H_t^r$. Each headset frame $H_t$ may be real $H_t^R$ or synthetic $H_t^S$. The encoder may produce a latent Gaussian distribution, $$\mu_t^y, \log \sigma_t^y \leftarrow \varepsilon(H_t). \quad \text{(Equation 6)}$$

At training time, the latent Gaussian distribution may be sampled to provide a latent code, $$y_t \sim \mathcal{N}(\mu_t^y, \sigma_t^y). \quad \text{(Equation 7)}$$

The decoder $\mathcal{D}$ (e.g., the decoding module 120) may produce a headset frame from the latent code y and an indicator variable, $$\hat{H}_t \leftarrow \mathcal{D}(y_t, R), \quad \text{(Equation 8)}$$

where $R \in \{0,1\}$ indicates whether the decoder should decode a received (real) headset from or a simulated (synthetic) headset frame. Thus, the indicator variable may allow the latent code y to contain no modality-specific information, as the decoder $\mathcal{D}$ may receive all the modality-specific information from the indicator variable $\hat{H}_t$.

To train the network, the systems described herein may optimize the reconstruction loss, retargeting loss, and KL-divergence loss, $$l(\theta) = \Sigma \lambda_H \|H_t - \hat{H}_t\|^2 + \lambda_A \|z_t - A_{y \rightarrow z} y_t\|^2 + \lambda_Y KL(\mathcal{N}(\mu_t^y, \sigma_t^y) \| \mathcal{N}(0, I)), \quad \text{(Equation 9)}$$

where $z_t$ is known only for synthetic headset frames $H^S$, $A_{y \rightarrow z}$ linearly maps from the second latent vector y to the first latent vector z, and λ may represent a weighting term associated with each term of the loss (e.g., $\lambda_H$, $\lambda_A$, and $\lambda_Y$). Thus, a headset image may be received as input to the headset encoding network ε to produce the second latent vector y. The second latent vector y may then be translated to the first latent vector z, and the first latent vector z may be decoded into avatar geometry $\hat{M}$ and texture $\hat{T}$ and rendered on a user headset.

As detailed above, the instant disclosure may involve training deep neural networks to provide improved rendering of avatars for interactive VR/AR presentations. For example, while traditional computer graphic models typically require modeling fine features to achieve realism, the disclosed systems may train a deep model to predict a joint representation of geometry and texture, thus providing superior rendering.

As detailed above, the computing systems described and/or illustrated herein broadly represent any type or form of computing device or system capable of executing computer-readable instructions, such as those contained within the modules described herein. In their most basic configuration, these computing device(s) may each include at least one memory device (e.g., memory device 140) and at least one physical processor (e.g., physical processor 130). These computing systems broadly represent any single or multi-processor computing device or system capable of executing computer-readable instructions. Examples of such computing systems include, without limitation, workstations, laptops, client-side terminals, servers, distributed computing systems, handheld devices, or any other computing system or device.

In some examples, the term "memory device" generally refers to any type or form of volatile or non-volatile storage device or medium capable of storing data and/or computer-readable instructions. In one example, a memory device (such as memory device 140) may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor (such as physical processor 130) may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive geometry and texture information to be transformed, transform the geometry and texture information, output a result of the transformation to train a deep model to predict a joint representation of geometry and texture, and use the result of the transformation to provide realistic rendering of an avatar for VR/AR presentations. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer system comprising:
   an autoencoder that is configured to:
      jointly encode texture information and geometry information to provide a latent vector;
      infer, for a predicted viewpoint using the latent vector:
         an inferred geometry of a subject; and
         an inferred view-dependent texture of the subject; and
   a rendering module that is configured to render an image of the subject for the predicted viewpoint using the inferred geometry and the inferred view-dependent texture.

2. The computer system of claim 1, wherein the latent vector comprises a representation of a facial expression of the subject.

3. The computer system of claim 1, wherein the geometry information comprises a three-dimensional mesh of the subject that is tracked over a time period.

4. The computer system of claim 1, wherein:
   the geometry information is indicative of a variation in geometry of the subject over a plurality of time instants; and
   the texture information comprises a plurality of images of the subject at each time instant of the plurality of time instants, wherein each image:
      is associated with a respective viewpoint of the subject; and
      comprises a view-dependent texture map of the subject that is dependent on the respective viewpoint of the subject.

5. The computer system of claim 4, wherein, for each image in the plurality of images:
   the image has a plurality of pixels, each pixel having an associated color; and
   the computer system is configured to unwrap the image by casting rays through each pixel and assigning an intersected texture coordinate to the associated color of each respective pixel.

6. The computer system of claim 4, wherein, for each time instant in the plurality of time instants, the autoencoder is configured to average the respective view-dependent texture maps associated with the plurality of images.

7. The computer system of claim 4, wherein the autoencoder is a conditional autoencoder that is configured to condition at least one variable that is associated with each image, and the latent vector does not contain any information about the at least one variable.

8. The computer system of claim 7, wherein the at least one variable comprises the respective viewpoint associated with each image, and the latent vector does not contain any viewpoint information.

9. The computer system of claim 8, wherein the autoencoder is configured to infer the inferred geometry and the inferred view-dependent texture by using the latent vector as well as a view vector of the subject for the predicted viewpoint.

10. The computer system of claim 1, wherein the computer system is configured to:
    infer the inferred geometry and the inferred view-dependent texture in real time; and
    render an animated series of reconstructed images in real time.

11. The computer system of claim 10, wherein the animated series of reconstructed images comprises at least one of:
    a virtual reality (VR) presentation for display on a VR headset; or
    an augmented reality (AR) presentation for display on an AR headset.

12. A computer-implemented method comprising:
    jointly encoding, by an autoencoder, texture information and geometry information to provide a latent vector;
    inferring, for a predicted viewpoint using the latent vector:
       an inferred geometry of a subject; and an inferred view-dependent texture of the subject; and
rendering an image of the subject for the predicted viewpoint using the inferred geometry and the inferred view-dependent texture.

13. The computer-implemented method of claim 12, wherein:
the geometry information is indicative of a variation in geometry of the subject over a plurality of time instants; and
the texture information comprises a plurality of images of the subject at each time instant of the plurality of time instants, wherein each image:
is associated with a respective viewpoint of the subject; and
comprises a view-dependent texture map of the subject that is dependent on the respective viewpoint of the subject.

14. The computer-implemented method of claim 13, further comprising conditioning the respective viewpoint associated with each image, wherein the latent vector does not carry any viewpoint information.

15. The computer-implemented method of claim 12, wherein:
inferring the inferred geometry of the subject and the inferred view-dependent texture of the subject comprises inferring the inferred geometry of the subject and the inferred view-dependent texture of the subject in real time; and
the computer-implemented method further comprises rendering an animated series of reconstructed images of the subject in real time, the animated series of reconstructed images comprising at least one of:
a virtual reality (VR) presentation for display on a VR headset; or
an augmented reality (AR) presentation for display on an AR headset.

16. A computer system comprising:
a plurality of cameras arranged proximate a subject, each camera configured to capture an image of a subject that is associated with a respective viewpoint of the subject;
an input module configured to receive:
geometry information indicative of a variation in geometry of a subject over a plurality of time instants; and
from the plurality of cameras, a plurality of images of the subject at each of the plurality of time instants, wherein each image is associated with a respective viewpoint of the subject;
an autoencoder that is configured to:
jointly encode texture information included in the plurality of images and the geometry information to provide a latent vector;
infer, for a predicted viewpoint using the latent vector:
an inferred geometry of a subject; and
an inferred view-dependent texture of the subject; and
a rendering module that is configured to render a reconstructed image of the subject for the predicted viewpoint using the inferred geometry and the inferred view-dependent texture.

17. The computer system of claim 16, wherein the computer system is configured to infer the inferred geometry and the inferred view-dependent texture of the subject in real-time and render an animated series of reconstructed images of the subject in real-time.

18. The computer system of claim 17, wherein:
the rendered animated series of reconstructed images comprise at least one of:
a virtual reality (VR) presentation for display on a VR headset; or
an augmented reality (AR) presentation for display on an AR headset; and
the computer system is configured to learn correspondence between the plurality of images from the plurality of cameras and images from cameras mounted on at least one of:
the VR headset; or
the AR headset.

19. The computer system of claim 16, wherein the computer system is further configured to:
use the reconstructed image to re-render a plurality of simulated headset images of the subject, each simulated headset image being associated with a viewpoint of a plurality of simulated VR or AR headset cameras;
receive a plurality of received headset images of the subject from a plurality of VR or AR headset cameras; and
jointly encode the plurality of simulated headset images and the plurality of received headset images to provide a second latent vector.

20. The computer system of claim 19, wherein the computer system is configured to condition the plurality of simulated headset images and the plurality of received headset images such that the latent vector does not contain information indicating whether a received headset image is a simulated headset image or a received headset image.

* * * * *